US011218544B1

United States Patent
Gallego et al.

(10) Patent No.: US 11,218,544 B1
(45) Date of Patent: Jan. 4, 2022

(54) TIERED QUEUING SYSTEM

(71) Applicant: Vectorized, Inc., San Francisco, CA (US)

(72) Inventors: Alexander Gallego, San Francisco, CA (US); Noah Watkins, San Francisco, CA (US)

(73) Assignee: Vectorized, Inc., San Francisco, CA (US)

(*) Notice: Subject to any disclaimer, the term of this patent is extended or adjusted under 35 U.S.C. 154(b) by 0 days.

(21) Appl. No.: 17/036,489

(22) Filed: Sep. 29, 2020

(51) Int. Cl.
G06F 15/16 (2006.01)
H04L 29/08 (2006.01)

(52) U.S. Cl.
CPC .................. *H04L 67/1097* (2013.01)

(58) Field of Classification Search
CPC ............... H04L 67/1097; G06F 12/121
See application file for complete search history.

(56) References Cited

U.S. PATENT DOCUMENTS

| 10,019,364 | B2 * | 7/2018 | Shetty | G06F 3/0613 |
| 11,074,196 | B1 * | 7/2021 | Aleti | G06F 12/121 |

OTHER PUBLICATIONS

Ongaro, D., et al., "In Search of an Understandable Consensus Algorithm (Extended Version)", Published May 20, 2014, <https://raft.github.io/raft.pdf> (18 pp).

Unknown, "The Raft Consensus Algorithm", <https://raft.github.io/>, Downloaded Sep. 25, 2020 (11 pp).

Das, A., et al., "SWIM: Scalable Weakly-consistent Infection-style Process Group Membership Protocol", <http://www.cs.cornell.edu/info/projects/spinglass/public_pdfs/SWIM.pdf> Downloaded Sep. 25, 2020 (10 pp).

Gallego, A., "Seastar: the futures> is here", <https://www.alexgallego.org/concurrency/smf/2017/12/16/future.html> Dec. 16, 2017 (8 pp).

Sax, M.J., "Apache Kafka", S. Sakr, A. Zomaya (eds.), Encyclopedia of Big Data Technologies, https://doi.org/10.1007/978-3-319-63962-8_196-1, <https://link.springer.com/content/pdf/10.1007%2F978-3-319-63962-8_196-1.odf>. Downloaded Sep. 25, 2020 (8 pp).

Kreps, J., et al., "Katka: a Distributed Messaging System for Log Processing", NetDB'11, Jun. 12, 2011, Athens, Greece. <http://pages.cs.wisc.edu/~akella/CS744/F17/838-CloudPapers/Kafka.pdf> (7 pp).

(Continued)

*Primary Examiner* — Yves Dalencourt
(74) *Attorney, Agent, or Firm* — Young Basile Hanlon & MacFarlane, P.C.

(57) ABSTRACT

Disclosed herein are methods, apparatuses, and systems for operating a tiered queuing system that includes: identifying a first segment to be evicted from a local storage in a first region based on an eviction policy; storing the first segment in a cold storage provided by a cloud service provider in the first region; deleting at least one instance of the first segment from the local storage in the first region; indicating in a segment index that the first segment is stored in the cold storage; responsive to receipt of a read request, reading an entry in the segment index for a second segment; and responsive to an indication that the second segment is stored by the cloud service provider, copying the second segment to the local storage and responding to the read request using the second segment stored in the local storage.

18 Claims, 10 Drawing Sheets

(56) References Cited

OTHER PUBLICATIONS

Amazon Web Services, "Amazon S3 Features", https://aws.amazon.com/s3/features/, Downloaded Sep. 25, 2020 (5 pp).
Amazon Web Services, "Amazon S3 Storage Classes", <https://aws.amazon.com/s3/storage-classes/>, Downloaded Sep. 25, 2020 (6 pp).
Wikipedia, "Column-oriented DBMS", <https://en.wikipedia.org/wiki/Column-oriented_DBMS> Downloaded Sep. 25, 2020 (7 pp).
Amazon Web Services, Amazon Simple Storage Service, "CopyObject",<https://docs.aws.amazon.com/AmazonS3/latest/API/APL_CopyObject.html> , Downloaded Sep. 25, 2020 (12 pp).
Apache Software Foundation, "Apache Parquet", <https://parquet.apache.org/documentation/latest/> Downloaded Sep. 25, 2020 (7 pp).
Koshy, J., et al., "Kafka Mirroring (MirrorMaker)", <https://cwiki.apache.org/confluence/pages/viewpage.action?pageId=27846330>Last Modified Jun. 23, 2017 (3 pp).
Loza, R., "Mirror Maker v2.0", DZone, <https://dzone.com/articles/mirror-maker-v20>, Jun. 1, 2020 (13 pp).

\* cited by examiner

TIERED QUEUING SYSTEM

BACKGROUND

Queuing systems, such as Apache Kafka, can be utilized in various computerized systems to receive and process large volumes of data. Queues can be utilized in a variety of fields, such as content delivery networks, telecommunications, messaging services, and other large-scale internet enabled applications. Some queuing systems permit data to be queued according to label (e.g., by topic) with the data associated with a label being organized in various partitions and/or segments across various computing and storage devices for later processing and storage.

SUMMARY

Disclosed herein are aspects of methods and apparatuses relating to queuing systems.

In an implementation, a method for operating a tiered queuing system is disclosed. The method includes identifying, by a computing device in a first region, a first segment to be evicted from a local storage in the first region based on an eviction policy, storing the first segment in a cold storage in the first region provided by a cloud service provider, deleting at least one instance of the first segment from the local storage in the first region, indicating in a segment index that the first segment is stored in at least one cold storage, responsive to receipt of a read request, reading an entry in the segment index for a second segment, and responsive to an indication that the second segment is stored by the cloud service provider, copying the second segment to the local storage and responding to the read request using the second segment stored in the local storage.

In an implementation, an apparatus comprising a memory and a processor configured to execute instructions stored in the memory is disclosed. The instructions include instructions to identify a first segment to be evicted from a local storage in a first region based on an eviction policy, store the first segment in a cold storage in the first region provided by a cloud service provider, delete at least one instance of the first segment from the local storage in the first region, indicate in a segment index that the first segment is stored in the cold storage, responsive to receipt of a read request, read an entry in the segment index for a second segment, and responsive to an indication that the second segment is stored by the cloud service provider, copy the second segment to the local storage from the cloud service provider and respond to the read request by reading from the second segment stored in the local storage.

In an implementation, a tiered queueing system is disclosed. The tiered queuing system includes a plurality of computing devices in a first region configured to receive queue requests and store data associated with the received queue requests in a plurality of segments in local storage in the first region. At least one of the computing devices is further configured to respond to a read request by reading an entry in a segment index associated with a first segment, determining, based on the entry, that the first segment is stored in a cold storage, determining that the cold storage in which the first segment is stored is a cold storage in a second region and not a cold storage in a first region, copying the first segment from the cold storage in the second region to the cloud storage in the first region using a cloud-native copy operation, copying the first segment from the cold storage in the first region to the local storage in the first region, and determining a response to the read request by reading the first segment from the local storage in the first region.

These and other implementations of the present disclosure are disclosed in the following detailed description, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features may be arbitrarily expanded or reduced for clarity.

DETAILED DESCRIPTION

Figure 1:
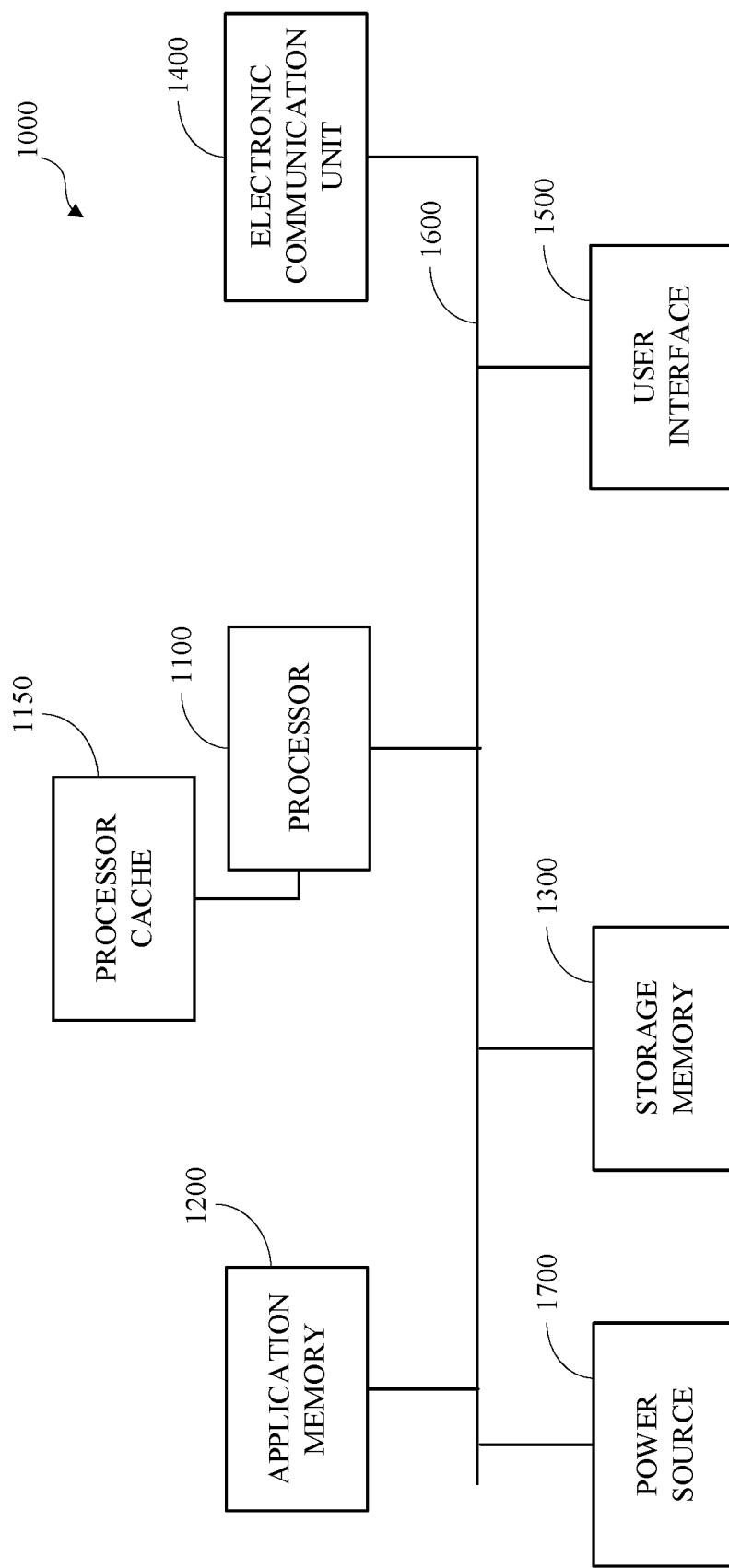
FIG. 1 is a block diagram of an example of a computing device.

Queuing systems are generally designed to permit the queuing of large amounts of data for later processing in order to decouple the production of data from the consumption of data. In general, the heart of a queuing system is one or more queues, where data is consumed in the order in which it is received. An example queue is described in more detail with respect to FIG. 4. An example use case for a queuing system is described in more detail with respect to FIG. 5. A notable feature of queuing systems is the availability of the queuing system in order to prevent the loss of data which may be produced at substantial rates and may be lost if not captured by the queueing system.

It may be necessary to, in certain use cases, to retain the data processed by a queuing system for an extended period of time, e.g., for 3, 7 or a greater number of years. The storage preferably used by queuing systems may not be well suited for long-term storage due to a high cost per gigabyte associated with relatively fast storage technologies such solid-state storage which may include, e.g., NVMe (non-volatile memory express) and reduced frequency of access for older data. By contrast, it may be more beneficial to store data that may have a relatively lower standard of access requirements in less costly storage, e.g., spinning disk volumes or tape storage, which may have a higher latency or lower speed of access. Such long-term storage may be referred to as "cold storage." However, it may be more difficult for a user of a queuing system to access data stored in cold storage, e.g., if such data must be manually restored or if it must be accessed using a different interface, e.g., a different application programming interface (API).

In addition, for fault-tolerance, it may be necessary to store queuing system data in multiple geographical regions, e.g., for compliance reasons. Synchronization of data across multiple regions is bandwidth and time intensive and may require multiple copies of data to be made. For example, if data were stored in three raft nodes in a region (as further described later) and that data were to be copied to another region, a typical approach would be to implement a software process (e.g., a mirror maker) that copies the data associated from the raft leader, transmits a full copy of the data to the other region, and then store that data in the other region. This approach may require multiple copying operations of the data and may require the data be transmitted to and stored in triplicate in the other region. This approach may require materializing the data in the other region (e.g., in accordance with the fault tolerance protocol in use). For example, if raft is used, the copied data may be stored by a raft leader in the other region and the raft leader may transmit the data to two or more raft followers, thus creating at least two additional copies of the data. Such an approach may require different interfaces to be used in order to access older data. Such a process has several inefficiencies in terms of bandwidth, disk usage, time, and interface, for example, as described above. Storing data across regions may further have the disadvantage that data may be requested from a region in which the data may not be stored.

Implementations of the tiered queuing systems described in this disclosure utilize a tiered storage system designed to address some or all of the previously described limitations. Information received by a queueing system may first be stored in local storage associated with the queuing system and later moved to cold storage in a particular region. As implemented, the information can later be retrieved automatically in response to a request for the data, regardless of which region the data is stored in and requested from. The implementations described herein may provide improvements of 3× or more measured against the implementations described in the preceding paragraph. For example, the described implementations may reduce network saturation, bandwidth utilization, latency, resource utilization, and other metrics that may operate as constraints (e.g., that operate to limit the performance of) to a queuing system.

For example, implementations of this disclosure may better enable disaster recovery and compliance requirements by utilizing cold storage provided by a cloud services provider that provides high levels of data durability (e.g., 11 9s of reliability). For example, implementations of this disclosure may enable easier access to data stored in cold storage by storing segments in the cold storage in a self-describing manner such that recovery from the cold storage alone is possible and/or so that a separate index is not required in the cold storage to identify segments.

For example, implementations of this disclosure permit access to segments stored in local storage and cold storage using a single unified API. For example, users of such a queueing system may be able to utilize existing APIs (e.g., such as used for existing queuing systems, such as Apache Kafka) to access data from topics, partitions, and segments, regardless of how or where such data is stored. A separate API is not required to access data stored in different regions or in cold storage.

For example, implementations of this disclosure enable the disaggregation of compute (e.g., the computing devices used to process read requests and queue requests) and storage. One advantage of disaggregation is that it permits the creation of read-replicas of segments with little additional effort so as to enable scalability in responding to read requests, for example, to scale to accommodate greater volumes of read requests than may desirably be handled by the computing devices in the queuing system that handle queue requests (e.g., that enqueue data in the queueing system). For example, the local storage and/or the cold storage may be implemented using a folder in a storage volume provided by a cloud service provider. The folder may be implemented in such a way that the data in the folder is self-describing. For example, the folder may include an index file that indicates the segments stored in the folder. The index file may be used to discover what segments are stored in the folder. Accordingly, when a read request is received by a computing device, e.g., in a different region, or that is created in order to scale processing capability to process additional volumes of read requests, the computing device need only access the storage volume (e.g., of cold storage) in order to determine what segments are available to be read. Such a computing device then may be able to more efficiently locate and download the relevant segment(s) in order to respond to such a read request.

As a further example, implementations of this disclosure may integrate a scripting capability to enable transformations of segments when they are moved to cold storage from local storage. For example, such functionality may permit the conversion of segments into a column-oriented data storage format that interleaves multiple segments into a single file or set of files on a column-oriented basis. Such interleaving may reduce storage size and improve later processing speeds and may be particularly useful for combining segments that have or are anticipated to have fewer associated read requests or that may be correlated in some way. Other transformations are possible. For example, transformations may include data enrichment (e.g., adding additional data to the segment), data masking (e.g., removing data, such as by de-identifying data or removing personal information), or combinations thereof. For example, compliance with various data protection laws, such as the General Data Protection Regulation (GDPR) in Europe, may require the removal of certain personal information. Such transformations and/or data masking may be utilized to achieve such compliance requirements.

For example, a queue request can be composed of a key/value pair that is to be placed in a queue. A queue request can be associated with a topic, which can be identified using an arbitrary string. A topic can be assigned to one of many partitions using a hashing algorithm (e.g., which may in at least some cases be executed client-side and the partition assignment may be incorporated into the queue request). The number of partitions can vary depending on the volume of queue requests expected for a given topic and the computing and memory capacity of the computing devices.

In implementations of this disclosure, partitions may be configured on a region basis—for example, a first set of partitions (and the computing devices associated with such partitions) may be assigned to a first region, a second set of partitions to a second region, and so on. By segregating partitions by region, queue requests from clients in a particular region may be more efficiently processed by computing devices located in that region. As used herein, a region refers to an area that is within geographical proximity or network proximity (e.g., based on available bandwidth and optimal network routing). For example, regions could include "US-EAST" (e.g., network nodes located east of the Mississippi River in the United States), "US-WEST" (e.g., network nodes located west of the Mississippi River in the United States) and "CANADA" (e.g., network nodes located in Canada). Regions may, but do not have to, be defined according to political boundaries, e.g., for data protection and compliance reasons. Regions may be defined to be smaller or larger than the prior examples—e.g., the entire United States, or a single state, such as California or North Carolina.

Each partition can be configured with its own raft group to manage the fault tolerance of the queue requests received for that partition. For example, the raft group for a partition including three computing devices can establish a leader which will process queue requests and two followers to which the data associated with processed queue requests will be replicated from the leader. In this way, using the raft protocol, the data associated within individual partitions can be processed and stored in a fault tolerant manner and the overall administrative information regarding the computing device membership for all partitions can be managed in a fault tolerant manner and also be available on each computing device and core. In implementations of this disclosure, the members of a raft group for a partition may all be located in the same region.

For example, a raft group leader for a partition of a topic may process a received queue request including data for that topic. The raft group leader may cause the data from the queue request to be stored in a file associated with the topic. Storage of data associated with a topic may be stored in "segments." For example, a segment may be a file that stores up to a certain amount of data (e.g., 500 MB, 1 GB, 1 TB or the like, depending on the computing and storage capabilities of the computing devices and local storage and the volume of data processed by the partition over a unit of time). Once a segment is filled with that amount of data, a new segment for the partition may be started. The raft group leader may cause data to be synchronized to raft group followers, e.g., on a per-segment basis, such that once a segment is filled with data, it is synchronized.

The tiered queueing systems described herein may optionally be implemented in whole or in part in a cloud-native fashion. For example, the computing devices described herein may be provisioned in a cloud environment provided by one or more cloud service providers (e.g., Amazon, Google, Microsoft or the like). For example, the computing devices may be implemented using one or more compute resources provisioned in a cloud environment. For example, the local storage may be implemented using one or more storage resources provisioned in a cloud environment. The term "cloud-native" as used herein refers to the use of techniques designed to optimize an implementation for a cloud environment, such as by using cloud-specific APIs. For example, a cloud-native copy operation may utilize a cloud-specific API to copy files within the cloud infrastructure in an optimized way instead of using typical copy operations, e.g., which may utilize internet infrastructure, which may result in a less optimal result in terms of latency, bandwidth, and time to execute. For example, in the case of Amazon's Simple Storage Service, the CopyObject API may be utilized.

Implementations of the tiered queueing system described herein permit the tiering of storage into at least two tiers—local storage and cold storage. Segments stored in local storage may be moved to cold storage according to an eviction policy. The eviction policy may specify criteria which may be used to determine when a segment is to be moved. For example, once one or more criteria are met for a segment, the segment may be deleted from local storage, the segment may be copied to cold storage, and an indication may be placed in a segment index indicating that the segment is stored in cold storage. The segment index may be referenced when data is read from or written to a segment to determine where the segment is stored. If a segment is needed for a read or write operation and it is stored in cloud storage, the read or write operation may be blocked while the segment is retrieved from cold storage and copied back to local storage.

It may be necessary, e.g., for compliance or fault tolerance reasons, for a segment in cold storage to be stored in one region or a number of regions. For example, when a segment is migrated to cold storage, such cold storage may be configured to store the data in a single designated region or may be configured to automatically distribute the data in more than one region. If designated for one region, data may be copied to additional regions using a cloud-native copy operation.

A computing device in a first region may receive a read request for data associated with a topic or multiple topics that have associated segments stored in a different region or in more than one region. For example, a topic may have partitions in multiple regions and the data for the various partitions may be stored in local storage or cold storage in different regions. Accordingly, it may be necessary for a computing device in a first region to access partitions stored in a different region. Instead of transmitting the data, e.g., over the internet, the computing device may be configured to cause the invocation of a cloud-native copy operation to copy the partition data from a different region to its region (e.g., between cold storage of the different regions), and then further copy the partition data to local storage. The data then can be read from local storage and transmitted in response to the read request.

Implementations of the queuing systems described in this disclosure may utilize a data structure referred to as "iobuf" in order to achieve a queuing system that improves upon deficiencies found in existing queuing systems such as by utilizing zero-copy data handling of received data, such as described in co-pending U.S. patent application Ser. No. 16/997,243 which is incorporated herein by reference in its entirety.

Implementations of the queuing systems described in this disclosure may utilize a mathematically proven fault tolerant protocol, such as raft. Raft is further described in "In Search of an Understandable Consensus Algorithm (Extended Version)" by Ongaro and Ousterhout, available at https://raft.github.io/raft.pdf. For example, implementations of this disclosure may utilize a so-called management raft group (also referred to as "raft0") to which all computing devices are a member (and in certain implementations, all cores of all computing devices). The management raft group can be used to identify which computing devices and/or cores are designated to process which queue requests in a queuing system.

FIG. 1 is a block diagram of an example of a computing device 1000. One or more aspects of this disclosure, such as the client and server devices shown in FIG. 2 may be implemented using the computing device 1000. The computing device 1000 includes a processor 1100, processor cache 1150, application memory 1200, storage memory 1300, an electronic communication unit 1400, a user interface 1500, a bus 1600, and a power source 1700. Although shown as a single unit, one or more elements of the computing device 1000 may be integrated into a number of physical or logical units. For example, the processor cache 1150 and the processor 1100 may be integrated in a first physical unit and the user interface 1500 may be integrated in a second physical unit. Although not shown in FIG. 1, the computing device 1000 may include other aspects, such as an enclosure or one or more sensors.

The computing device 1000 may be a stationary computing device, such as a personal computer (PC), a server, a workstation, a minicomputer, or a mainframe computer; or a mobile computing device, such as a mobile telephone, a personal digital assistant (PDA), a laptop, or a tablet PC.

The processor 1100 may include any device or combination of devices capable of manipulating or processing a signal or other information, including optical processors, quantum processors, molecular processors, or a combination thereof. The processor 1100 may be a central processing unit (CPU), such as a microprocessor, and may include one or more processing units, which may respectively include one or more processing cores. The processor 1100 may include multiple interconnected processors. For example, the multiple processors may be hardwired or networked, including wirelessly networked. In some implementations, the operations of the processor 1100 may be distributed across multiple physical devices or units that may be coupled directly or across a network. In some implementations, the processor 1100 may be connected to the processor cache 1150 for internal storage of operating data or instructions. For example, each core within processor 1100 may have a separate processor cache 1150 unit or may have specified memory locations allocated to it within processor cache 1150. The processor 1100 may include one or more special purpose processors, one or more digital signal processor (DSP), one or more microprocessors, one or more controllers, one or more microcontrollers, one or more integrated circuits, one or more an Application Specific Integrated Circuits, one or more Field Programmable Gate Array, one or more programmable logic arrays, one or more programmable logic controllers, firmware, one or more state machines, or any combination thereof.

The processor 1100 may be operatively coupled with the processor cache 1150, application memory 1200, the storage memory 1300, the electronic communication unit 1400, the user interface 1500, the bus 1600, the power source 1700, or any combination thereof. The processor may execute, which may include controlling, which may include sending to and/or receiving electronic signals from, the application memory 1200, the storage memory 1300, the electronic communication unit 1400, the user interface 1500, the bus 1600, the power source 1700, or any combination thereof. Execution may be facilitated by instructions, programs, code, applications, or the like, which may include executing one or more aspects of an operating system, and which may include executing one or more instructions to perform one or more aspects described herein, alone or in combination with one or more other processors.

The application memory 1200 is coupled to the processor 1100 via the bus 1600 and may include any storage medium with application data access including, for example, DRAM modules such as DDR SDRAM, Phase-Change Memory (PCM), flash memory, or a solid-state drive. Although shown as a single block in FIG. 1, the application memory 1200 may be implemented as multiple logical or physical units. Other configurations may be used. For example, application memory 1200, or a portion thereof, and processor 1100 may be combined, such as by using a system on a chip design.

The application memory 1200 may store executable instructions or data, such as application data for application access by the processor 1100. The executable instructions may include, for example, one or more application programs, that may be executed by the processor 1100. The executable instructions may be organized into programmable modules or algorithms, functional programs, codes, code segments, and/or combinations thereof to perform various functions described herein.

The storage memory 1300 is coupled to the processor 1100 via the bus 1600 and may include non-volatile memory, such as a disk drive, or any form of non-volatile memory capable of persistent electronic information storage, such as in the absence of an active power supply. Although shown as a single block in FIG. 1, the storage memory 1300 may be implemented as multiple logical or physical units.

The storage memory 1300 may store executable instructions or data, such as application data, an operating system, or a combination thereof, for access by the processor 1100. The executable instructions may be organized into programmable modules or algorithms, functional programs, codes, code segments, or combinations thereof to perform one or more aspects, features, or elements described herein. The application data may include, for example, user files, database catalogs, configuration information, or a combination thereof. The operating system may be, for example, a desktop or laptop operating system; an operating system for a mobile device, such as a smartphone or tablet device; or an operating system for a large device, such as a mainframe computer.

The electronic communication unit 1400 is coupled to the processor 1100 via the bus 1600. The electronic communication unit 1400 may include one or more transceivers. The electronic communication unit 1400 may, for example, provide a connection or link to a network via a network interface. The network interface may be a wired network interface, such as Ethernet, or a wireless network interface. For example, the computing device 1000 may communicate with other devices via the electronic communication unit 1400 and the network interface using one or more network protocols, such as Ethernet, Transmission Control Protocol/Internet Protocol (TCP/IP), power line communication (PLC), Wi-Fi, infrared, ultra violet (UV), visible light, fiber optic, wire line, general packet radio service (GPRS), Global System for Mobile communications (GSM), code-division multiple access (CDMA), Long-Term Evolution (LTE) or other suitable protocols.

The user interface 1500 may include any unit capable of interfacing with a human user, such as a virtual or physical keypad, a touchpad, a display, a touch display, a speaker, a microphone, a video camera, a sensor, a printer, or any combination thereof. For example, a keypad can convert physical input of force applied to a key to an electrical signal that can be interpreted by computing device 1000. In another example, a display can convert electrical signals output by computing device 1000 to light. The purpose of such devices may be to permit interaction with a human user, for example by accepting input from the human user and providing output back to the human user. The user interface 1500 may include a display; a positional input device, such as a mouse, touchpad, touchscreen, or the like; a keyboard; or any other human and machine interface device. The user interface 1500 may be coupled to the processor 1100 via the bus 1600. In some implementations, the user interface 1500 can include a display, which can be a liquid crystal display (LCD), a cathode-ray tube (CRT), a light emitting diode (LED) display, an organic light emitting diode (OLED) display, an active matrix organic light emitting diode (AMO-LED), or other suitable display. In some implementations, the user interface 1500 may be part of another computing device (not shown), such as in addition to or instead of being part of the computing device 1000. In some implementations, the user interface 1500 may be omitted or implemented virtually using remote access technologies via the electronic communication unit 1400.

The bus 1600 is coupled to the application memory 1200, the storage memory 1300, the electronic communication unit 1400, the user interface 1500, and the power source 1700. Although a single bus is shown in FIG. 1, the bus 1600 may include multiple buses, which may be connected, such as via bridges, controllers, or adapters.

The power source 1700 provides energy to operate the computing device 1000. The power source 1700 may be a general-purpose alternating-current (AC) electric power supply, or power supply interface, such as an interface to a household power source. In some implementations, the power source 1700 may be a single use battery or a rechargeable battery to allow the computing device 1000 to operate independently of an external power distribution system. For example, the power source 1700 may include a wired power source; one or more dry cell batteries, such as nickel-cadmium (NiCad), nickel-zinc (NiZn), nickel metal hydride (NiMH), lithium-ion (Li-ion); solar cells; fuel cells; or any other device capable of powering the computing device 1000.

Figure 2:
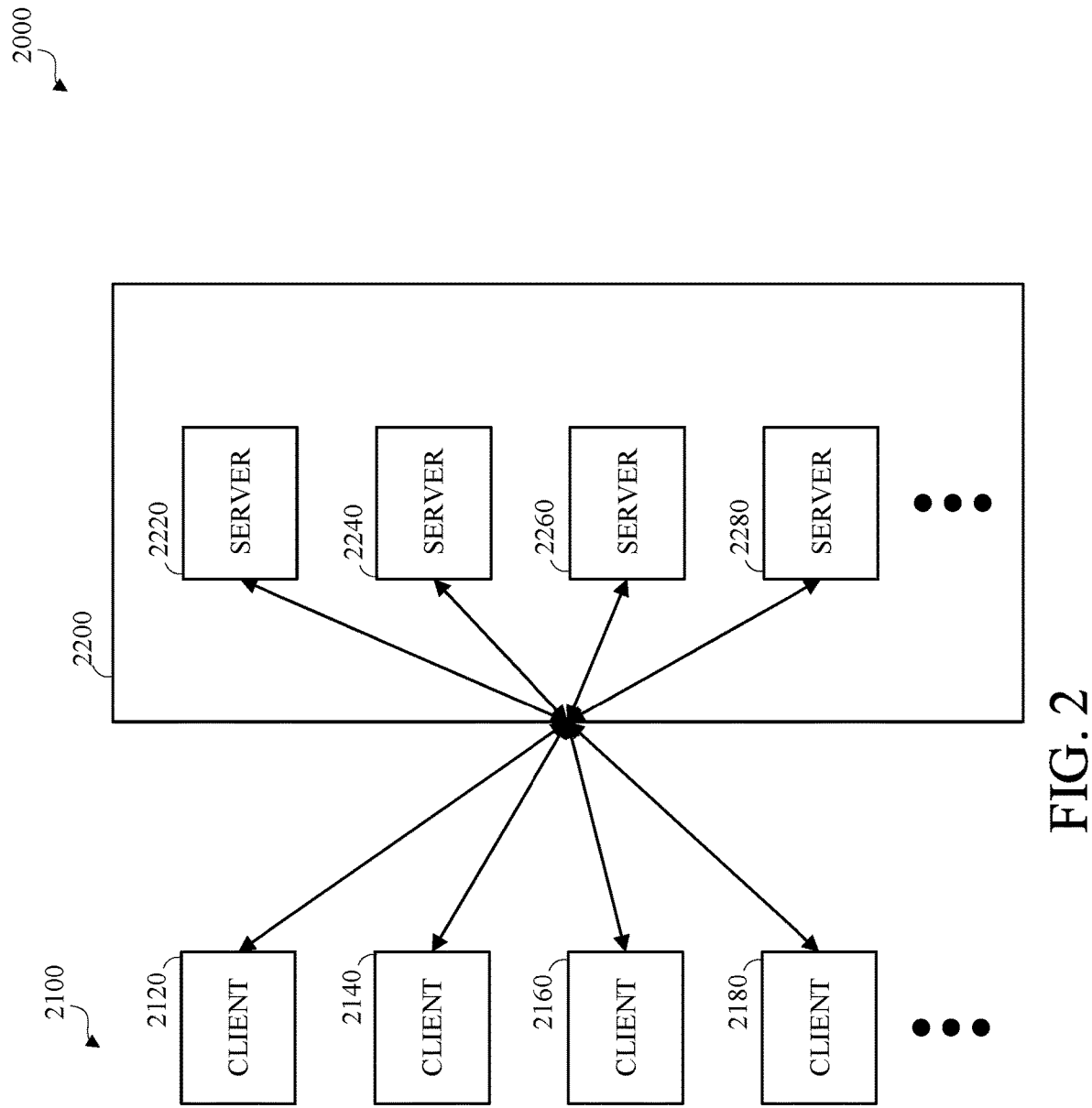
FIG. 2 is a block diagram of an example arrangement of computing devices used in a queuing system.

FIG. 2 is a block diagram of an example arrangement 2000 of computing devices used in a queuing system 2200. The computing devices can include a number of client devices 2100 and a number of server devices that comprise the queuing system 2200. As shown, there are four client devices 2120, 2140, 2160, and 2180 and four server devices 2220, 2240, 2260, and 2280. However, the number of client devices and server devices may vary depending on implementation. As described previously, the server devices 2220, 2240, 2260, and 2280 may implement a fault tolerant protocol that is mathematically proven, such as raft. Accordingly, queue batches and queue requests transmitted to the queuing system from one or more client devices may be routed or allocated to any one of the server devices 2220, 2240, 2260, and 2280 in a manner consistent with the raft protocol.

For example, queue batches or queue requests may be allocated randomly among the server devices 2220, 2240, 2260, and 2280 and if a queue request is not designated to be processed by the randomly assigned server device, such as the server device 2240, that server device may send a response message indicating which server device is designated to process that queue request, such as server device 2280. Alternatively, the server device 2240 may forward the message to the correct the server device 2280.

Figure 3:
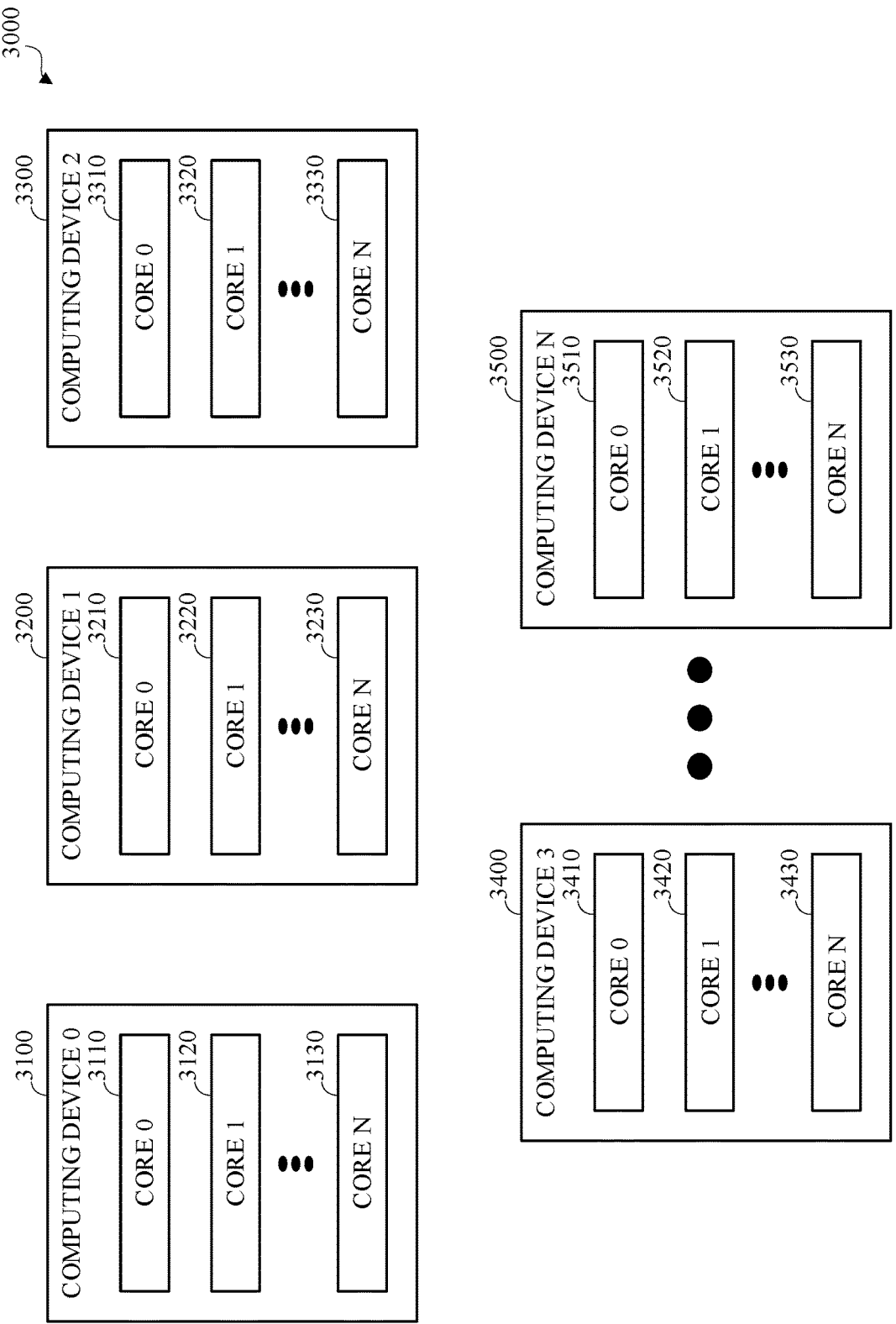
FIG. 3 is a block diagram of an example of a queuing system.

FIG. 3 is a block diagram of an example of a queuing system 3000. Queuing system 3000 includes computing devices 3100, 3200, 3300, 3400, 3500. As illustrated, queuing system 3000 includes 5 computing devices, however, implementations of this disclosure may have additional or fewer computing devices, for example, depending on the volume of queue requests, the capabilities of the computing devices, and the desired load factor of the computing devices. For example, the value of "N" could be 10 computing devices.

Each computing device 3100, 3200, 3300, 3400, 3500 may have a number of processing cores. For example, as shown, each computing device has three cores: 0, 1, and N-3110, 3120, 3130 for computing device 0; 3100, 3210, 3220, 3230 for computing device 1 3200; 3310, 3320, 3330 for computing device 2 3300; 3410, 3420, 3430 for computing device 3 3400; and 3510, 3520, 3530 for computing device N 3500.

As previously explained, the computing devices in queuing systems implemented according to this disclosure can utilize a mathematically proven fault tolerant protocol, such as raft. In the example of FIG. 3, the management raft group or raft0 group can include all of the computing devices in the queuing system. Other raft groups for various partitions of topics processed by the queuing system can encompass varying numbers and members of computing devices which may be selected differently for various implementations. For example, a first raft group for a first partition of a first topic could encompass computing devices 0 3100, 1 3200, and 2 3300. For example, a second raft group for a second partition of a first topic could encompass computing devices 0 3100, 3 3400, and N 3500. Other raft groups could have the same or different members as these examples.

Figure 4:
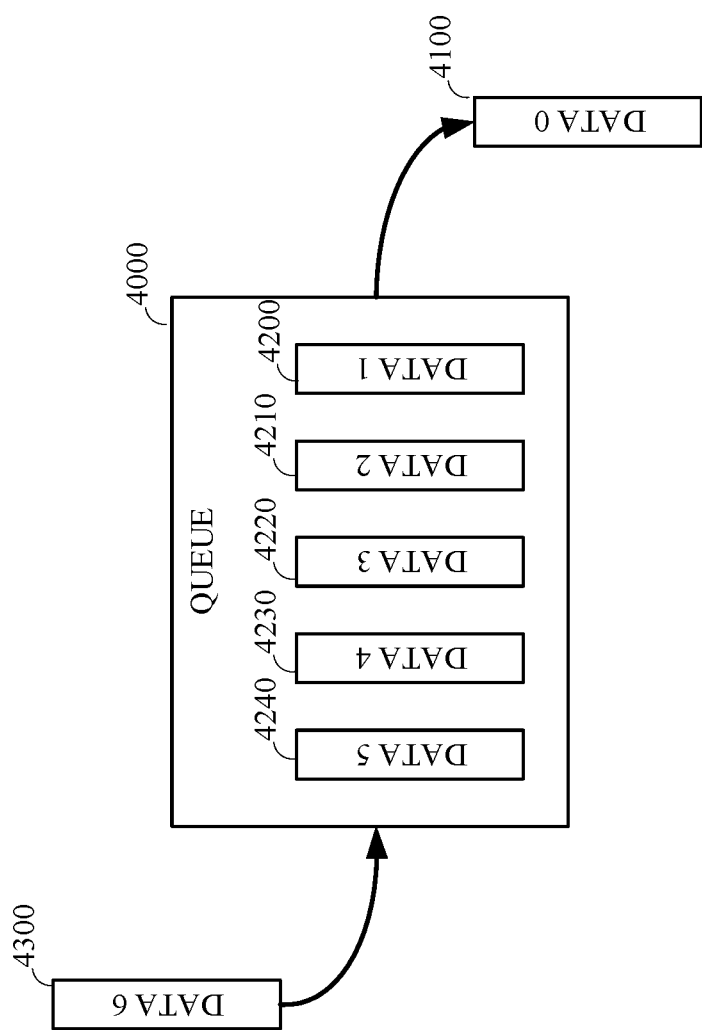
FIG. 4 is a block diagram illustrating an example of the operation of a queue.

FIG. 4 is a block diagram illustrating an example of the operation of a queue 4000. A queue is characterized by the property that data is consumed in the order in which it is received. For example, in the example shown, data 0 4100 is being consumed from the queue, the queue includes additional data elements data 1 4200, data 2 4210, data 3 4220, data 4 4230, and data 5 4240, in that order, and data 6 4300 is in the process of being added to the queue. In this example, the data elements were both received by the queue and will be consumed in the order data 0 4100, data 1 4200, data 2 4210, data 3 4220, data 4 4230, data 5 4240, and data 6 4300.

Depending on the implementation, the queue 4000 may persist data elements for a particular period of time or for an indefinite time and may retain or discard data elements when they are consumed. If data elements are not discarded once consumed, they may be retained in storage, such as in the form of a log of key/value pairs, for later retrieval and consumption.

Figure 5:
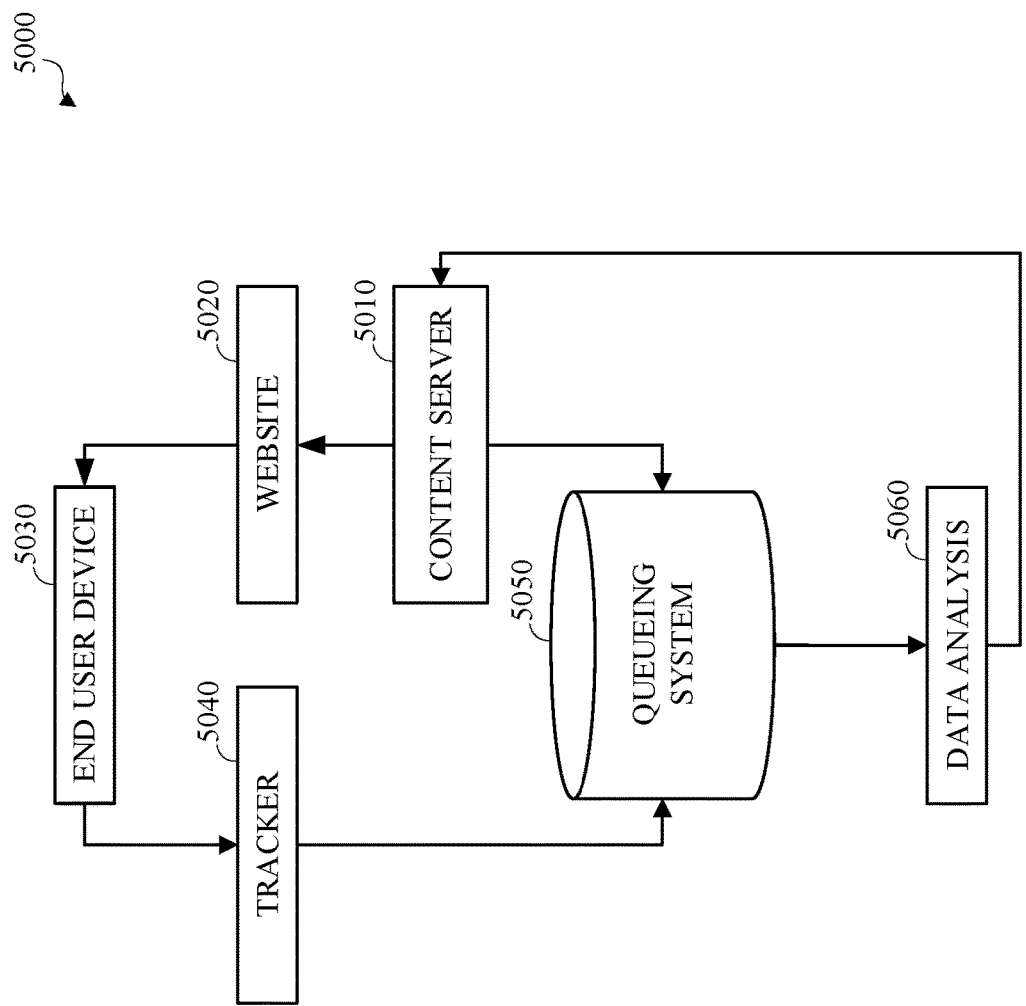
FIG. 5 is a block diagram illustrating an example of a content and analysis system utilizing a queue.

FIG. 5 is a block diagram illustrating an example of a content and analysis system 5000 utilizing a queue. The system 5000 includes a content server 5010 that provides content to a website 5020 for transmission and display by an end user device 5030. In some implementations, the content provided by the content server 5010 may be advertisements or other paid content. The content server 5010 is also configured to transmit to a queuing system 5050 information detailing the number of impressions, e.g., the number of times each piece of content is displayed to an end user device, such as the end user device 5030. For example, the information transmitted to the queuing system 5050 may include queue requests including key value pairs indicating the piece of content displayed and the end user to which it was displayed.

The system 5000 may also include a tracker 5040 which collects information about the interaction with the content on the end user device 5030. For example, the tracker 5040 may be configured to collect information when the content is clicked on. The tracker 5040 may be configured to send some or all of the collected information to the queuing system 5050. For example, the tracker 5040 may transmit to the queuing system 5050 queue requests including key value pairs indicating the pieces of content clicked on and the end users that clicked on the content.

The information queued in the queuing system 5050 may be consumed by a data analysis unit 5060. For example, the data analysis unit 5060 may be configured to analyze impressions and clicks over time to determine which content performs better with users and to adjust the content being provided by the content server 5010. In this use case, the queuing system 5050 serves to decouple data collection from data processing which may enable the processing of data collected over a longer time period and also may permit data to be collected at higher or irregular volumes than the consumer may be otherwise unable to effectively process.

Figure 6:
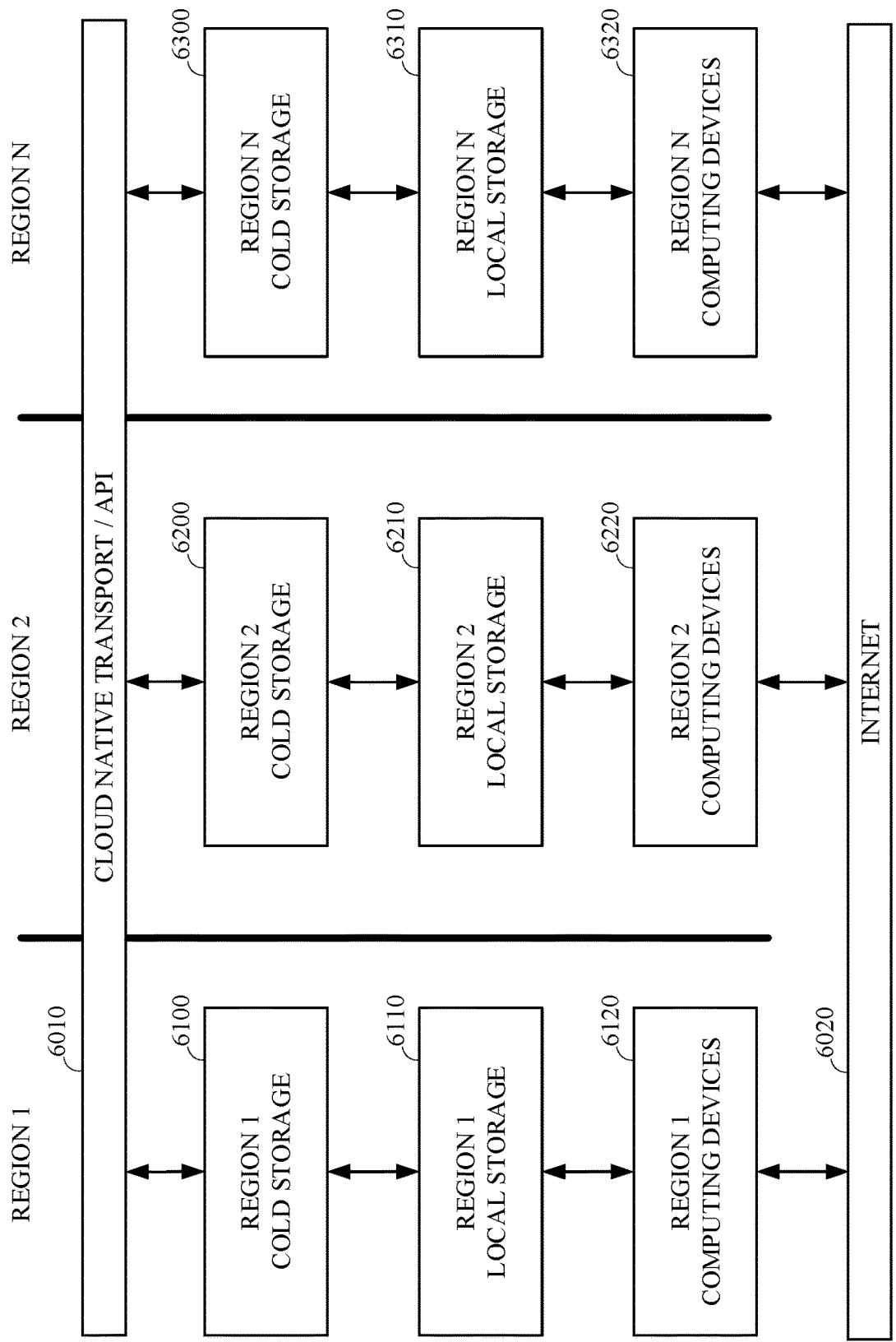
FIG. 6 is a block diagram of an example of a cloud-native implementation of a tiered queuing system.

The system 5000 as shown depicts only one example of a system in which a queuing system may be used. Many other use cases are possible. For example, a queuing system may be utilized in many systems in which it is desirable to decouple data collection and processing. It may also be beneficial to utilize a queuing system implemented according to this disclosure in situations where FIG. 6 is a block diagram of an example of a cloud-native implementation of a tiered queuing system, which may be a tiered implementation of the queuing system 5050. The cloud-native implementation of the tiered queuing system may utilize a cloud-native transport/API 6010 and internet 6020. The cloud-native transport/API 6010 refers to cloud-native API interfaces provided by a cloud services provider and/or network transport that is specific to the cloud services provider—e.g., dedicated fiber run between datacenters operated by the cloud services provider in different regions. For example, the cloud-native API interfaces may provide the mechanism by which the cloud-native transport is utilized. Because the cloud-native transport/API 6010 is operated by and optimized for the cloud services provider, it can provide faster, more efficient, and more cost effective transport between regions. The cloud-native transport/API 6010 may include the use of APIs provided by a cloud services provider. As one example, such an API may include the CopyObject API provided by Amazon Simple Storage Services.

Internet 6020 refers to publicly available networks and network interfaces that permit transmission of data to arbitrary end points. Internet 6020 is a flexible but generic network infrastructure and thus may not be as optimized or as cost effective for transmitting larger volumes of data as compared to dedicated point to point links.

FIG. 6 refers to three different regions, region 1, region 2, and region N. Region N indicates that there may be an arbitrary number of regions (e.g., more or less than three). Each depicted region includes associated computing devices, local storage, and cold storage, including region 1 cold storage 6100, region 1 local storage 6110, region 1 computing devices 6120, region 2 cold storage 6200, region 2 local storage 6210, region 2 computing devices 6220, region N cold storage 6300, region N local storage 6310, and region N computing devices 6320.

The computing devices in each region 6120, 6220, 6320 may be implemented in a manner consistent with the disclosure of FIGS. 1, 2, 3, and 7 herein. For example, there may be a plurality of computing devices in each region, and each computing device may have a plurality of cores.

The computing devices 6120, 6220, 6320 may respectively have access to local storage 6110, 6120, 6130. Local storage 6110, 6120, 6130 may refer to a collection of devices accessible from respective computing devices 6120, 6220, 6320 and individual portions of local storage may be allocated to individual computing devices or cores, depending on the implementation. For example, the local storage for a particular computing device may be physically located within or proximate to that computing device. Alternatively, one or more of the computing devices may be provisioned as a compute resource provided by a cloud services provider and the local storage may likewise be provisioned as a storage resource provided by a cloud services provider.

Cold storage 6100, 6200, 6300 may be used to store data for longer periods of time e.g., after the data does not need to regularly be accessed. Data, or segments, stored in local storage 6110, 6220, 6320 may be moved to cold storage according to an eviction policy as described later with respect to FIG. 8 and FIG. 9. Data, or segments, may be moved from cold storage to local storage as further described later with respect to FIG. 8 and FIG. 10. If a computing device in one region, e.g., in the region 1 computing devices 6120 requires access to segments stored in cold storage in a different region, e.g., in region 2 cold storage 6200, the computing device may cause the segment stored in region 2 cold storage 6200 to be copied to region 1 cold storage 6100 using the cloud-native transport/API 6010 and may then copy the segment from region 1 cold storage 6100 to region 1 local storage 6110. Such a process may be performed, for example, to a read request received by the computing device.

Figure 7:
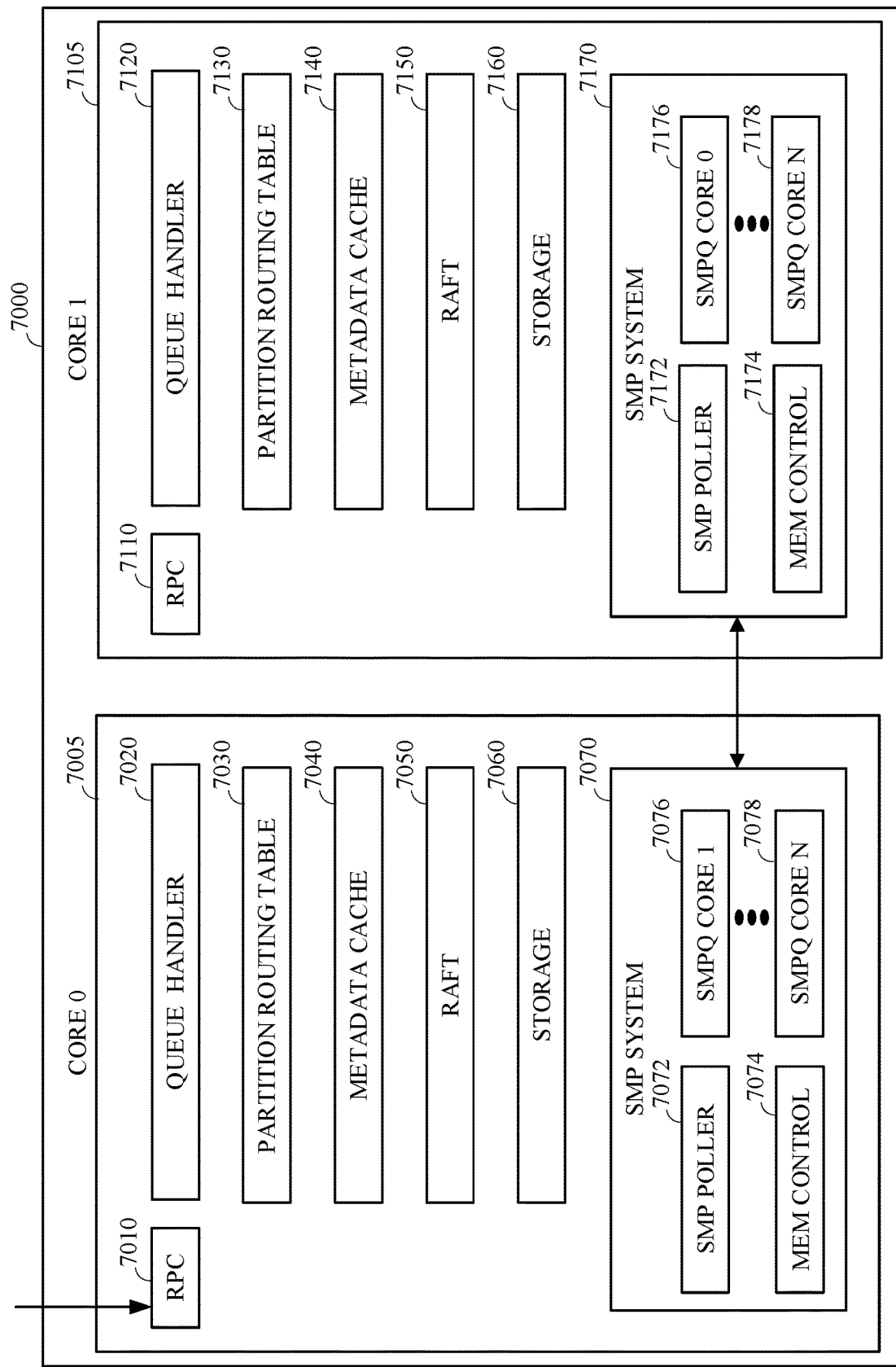
FIG. 7 is a block diagram of an example of components associated with a portion of a queuing system.

FIG. 7 is a block diagram of an example of components associated with a portion of a queuing system, such as the queueing system 5050. FIG. 7 includes an example server computing device 7000 having core 0 7005 and core 1 7105. Only two cores are pictured for ease of explanation, however in a typical implementation, there will be additional cores. Core 0 7005 and core 1 7105 each have a number of associated components, which may be implemented by instructions that are executed by a respective processing thread for each of the respective cores. In the implementation shown, each core has a single processing thread that is "pinned" for execution by that particular core.

Generally speaking, the processing threads of the cores may be implemented such that each are made up of or utilize processing units configured in the same or a similar way, although there may be exceptions such as those described below. The cores have respective RPC units 7010, 7110. The RPC (remote procedure call) unit handles communications received by an electronic communication unit. Generally speaking, a single core may be designated to receive all of the communications received by the server computing device 7000, in which case only one of the RPC units 7010, 7110 may be actively utilized. Depending on the operating system, it may not be possible to designate which core receives communications via the electronics communication unit, so the processing thread for each core may be configured such that any core is able to handle such communications.

The RPC units 7010, 7110 may handle the generation of "iobuf" data structures upon the receipt of a queue batch containing queue requests, such as described above with respect to FIG. 6. While this disclosure generally refers to a queue batch and queue request as describing the enqueuing or production of data on or to a queue in the queueing system, a queue batch and queue request may also include a request to dequeue or consume data on a queue or to provide administrative commands or functions to the queueing system. When queue requests are transmitted to a different computing device according to the fault tolerance protocol (e.g., raft), the RPC units 7010, 7110 (one or both, as the case may be) may also receive such requests as well.

Figure 8:
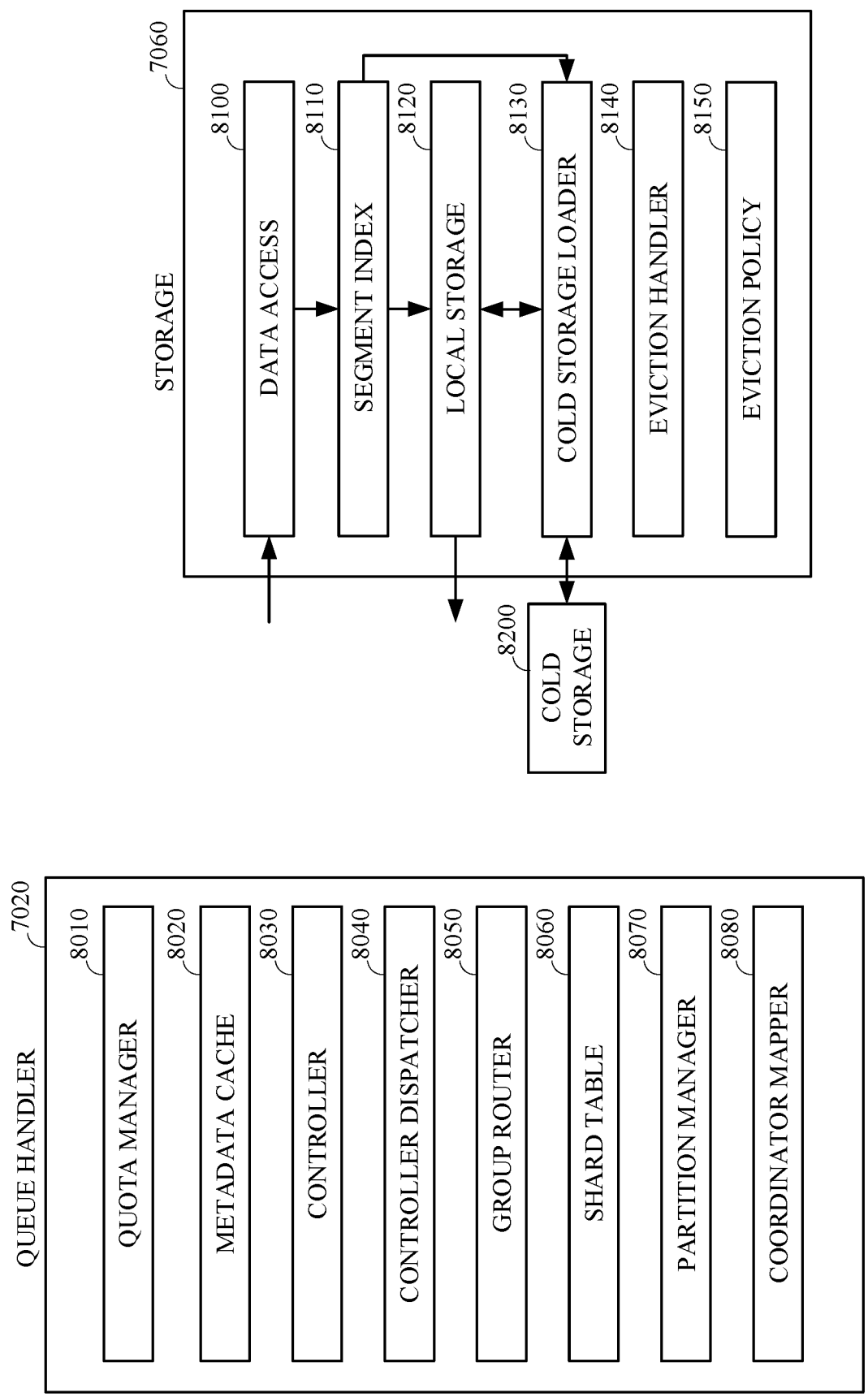
FIG. 8 is a block diagram of an example of certain components of the queuing system.

A queue handler 7020, 7120 may be configured to handle the processing of queue requests, for example, utilizing the units and processes described in further detail with respect to FIG. 8. The queue handler 7020, 7120 may be configured to utilize a partition routing table 7030, 7130; a metadata cache 7040, 7140; raft 7050, 7150; a storage 7060, 7160; and/or a SMP (structured message passing) system 7070, 7170 to properly process requests.

Partition routing table 7030, 7130 provides a cache stored locally for each core that indicates which core(s) are designated to process which partition(s). For example, as previously described earlier, a queue request may concern a topic which may be segmented into multiple partitions which each process a subset of the queue requests for that topic. The partition routing table 7030, 7130 may be utilized to look up a partition identifier to determine, for example, whether a queue request is to be processed using the core on which the queue request is received or a different core. If the queue request is to be processed using a different core, a structured message will be sent to that different core using the SMP system 7070, 7170 and the queue request will not generally be further processed on the receiving core (e.g., by the queue handler 7020, 7120).

The metadata cache 7040, 7140 provides a list of valid topics for each partition that can be utilized by, for example, the queue handler 7020, 7120 to verify that the queue request includes a valid topic for the partition. The metadata cache 7040, 7140 stores the list local to each core in order to avoid memory locks and to store the data in a physically proximate manner to the core in order to reduce latency for checking the metadata cache, since it may be checked for each queue request.

Raft 7050, 7150 is the unit that handles the fault tolerant protocol for the queuing system. For example, raft may be used which is a mathematically proven fault tolerant protocol. This means that raft has a mathematical proof indicating that the protocol is fault tolerant—e.g., it is proven that there will be no data loss of received queue requests so long as the protocol is followed.

Raft 7050, 7150 may be members of the so-called management raft group (also referred to as "raft0"). The management raft group is responsible for assigning raft groups (each of which may represent a partition of a topic, depending on the implementation) to various computing devices and a core of the respective computing devices. For example, a first partition may be assigned to core 0 7005 and a second partition may be assigned to core 1 7105. For example, for each raft group, raft0 may include a variable indicating a number of computing devices included in the raft group and the IP addresses of each of the computing devices included in the raft group.

When a partition is assigned to a computing device, a single core on that computing device may be assigned to process queue requests assigned to that partition. Each raft group elects a leader and the remaining members of the raft group are followers, as further described in the previously referenced documentation relating to the raft protocol. Generally, the leader of the raft group will process queue requests for a given raft group and will coordinate synchronization (e.g., replication) of the processed queue requests to other members of the raft group. For example, a message may be sent to the other computing device members of the raft group with the information to be replicated. The message may be received, for example, by a RPC unit of the target computing device(s) and then be handled using a queue handler and/or raft unit of the receiving core(s) of the target computing device(s).

When a new topic and/or new partition is created or a queue request is received with a new topic and/or new partition, raft 7050, 7150 may operate to create a new raft group representative of the new partition and computing devices and cores may be assigned to the new raft group and reflected in the management raft group. The assignment of partitions to raft groups is advantageously stored in the management raft group, to which all computing devices and cores may be a member, so that when a queue request is received by a core, the information relating to the assignment of the queue request is available locally (and thus, the assignment for processing may be determined without accessing memory of a different core or making a network request for the information on a queue request by queue request basis).

Raft 7050, 7150 may also operate to enable reading or consumption of data previously processed by the queuing system and stored, e.g., in the storage 7060, 7160. For example, consumer groups can be created to consume data stored across multiple partitions/raft groups. The resulting read requests may be distributed amongst the various raft groups for processing. The raft group leader from each raft group can be configured to handle such requests, including making an indicating that a particular piece of data (key value pair) has been read.

The storage 7060, 7160 may be used by raft 7050, 7150 to store data received via processed queue requests. For example, the storage 7060, 7160 may take the form of a log of key value pairs. For example, the storage logs described with respect to the raft documentation may be utilized. The storage 7060, 7160 may also be used to reflect when the various items in the log have been read.

The SMP system 7070, 7170 is used to pass structured messages between the cores of a computing device. Each respective SMP system 7070, 7170 includes a SMP poller 7072, 7172 and a memory control 7074, 7174 along with various structured message passing queues (SMPQ) for other cores, such as SMPQ core 1 7076 and SMPQ core N 7078 for core 0 7005 and SMPQ core 0 7176 and SMPQ core N 7178 for core 1 7105. In the illustrated example, 'N' reflects the possible number of cores, in which case the illustrated elements of FIG. 4 would be extended to reflect the number of cores according to the number implemented.

The SMP poller 7072, 7172 operates to periodically poll the SMP queues of other cores that are assigned to the core of the SMP poller 7072, 7172. In the illustrated example, the SMP poller 7072 will poll SMPQ core 0 7176 and SMPQ core N 7178 and the SMP poller 7172 will poll SMPQ core 1 7076 and SMPQ core N 7078. The SMP system 7070, 7170 does not have a SMPQ assigned to its own core because it is not necessary for a core to pass structured messages to itself. The memory control 7074 determines the memory chunks associated with structured messages sent and received using the SMP system 7070, 7170. For example, when a structured message is sent from the SMP system 7070 to the SMP system 7170 using SMPQ core 1 7076 and the SMP poller 7172 to process a queue request present in one or more memory chunks allocated to core 0 7005, the mem control 7074 may be configured to determine the memory chunks in which the queue request is stored and increment the reference counters associated with those memory chunks.

Correspondingly, the memory control 7074 may be configured to, responsive to a message obtained by the SMP poller 7072 from SMPQ core 0 7176 that core 1 7105 has processed the queue request, decrement the reference counters associated with the respective memory chunks. This process may be repeated multiple times for various memory chunks depending on how many queue requests (or portions thereof) are stored in each memory chunk. By doing so, the SMP system 7070 is able to track which of the memory chunks allocated to core 0 7005 are still in use. The memory control 7074 may be further configured to utilize this information by, responsive to the decrementing of a reference count to zero, cause the deallocation of the memory associated with that memory chunk.

FIG. 8 is a block diagram of an example of components of a queue handler 7020 and of a storage 7060. The queue handler 7020 may include a quota manager 8010, a metadata cache 8020, controller 8030, a controller dispatcher 8040, a group router 8050, a shard table 8060, a partition manager 8070, and a coordination mapper 8080. Additional or fewer components may be utilized depending on the implementation and requirements of the implemented queuing system. In certain implementations, the components of the queue handler 7020 may be implemented in a manner consistent with what is permitted or required in the protocols promulgated by Apache Kafka.

The quota manager 8010 may operate to control the bandwidth utilized by the queue handler 7020 and by extension the queuing system which uses the queue handler 7020. For example, the quota manager 8010 may operate to control bandwidth by throttling the receipt of and/or processing of queue batches or queue requests so as to keep the receipt or processing rate of queue batches or queue request within a desired value.

The metadata cache 8020 operates to assign the processing of partitions to computing devices, utilizing the cache stored in the metadata cache 7040, 7140. For example, if a queue request is set to the queue handler 7020 for processing and the queue request is not assigned to the computing device on which queue handler is executing, the metadata cache 8020 may return an error. The metadata cache 8020 may operate to periodically update the metadata cache 7040, 7140 to reflect updated partition to computer assignments in coordination and communication with raft 7050, 7150.

The controller 8030 operates to handle administrative requests, e.g., other than write requests. For example, the controller 8030 may be configured to handle requests to create or delete partitions or topics, or perform other administrative type requests, such as those found in implementations of Apache Kafka. In some implementations, the controller 8030 is only found in core 0 of a computing device and any such requests required to be processed by the controller 8030 are routed to core 0. Alternatively, the controller 8030 may be assigned to another arbitrary core and requests to be processed by the controller 8030 may be routed to that arbitrary core.

The controller dispatcher 8040 operates to transmit administrative messages to other computing devices in the queuing system responsive to requests handled by the controller 8030. For example, the controller dispatcher 8040 may transmit messages to other computing devices indicating that a partition has been created or deleted and providing information sufficient to update partition routing tables and metadata caches accordingly. As with the controller 8030, the controller dispatcher 8040 may be implemented on only one core of a computing device.

The group router 8050 operates to determine the raft group associated with a queue request by taking as input the topic and partition of the queue request and determining the associated raft group, e.g., by consulting the partition routing table and metadata cache stored locally with the associated core.

The shard table 8060 operates to store and determine which core owns each raft group. The shard table 8060 may be implemented in a manner to randomly, equally, or in some other manner distribute the processing of and leadership of the various raft groups assigned to a computing device to the various cores of the computing device. This process may be undertaken locally to a computing device, as the core assigned to a particular raft group may be different on the various computing devices that comprise a raft group.

The partition manager 8070 operates to manage the consumption of data queued in the queuing system. For example, a consumer group covering the partitions associated with a topic can be created to permit the coordinated consumption of the data in all the partitions associated with a topic. The consumer group may be assigned to a computing device to coordinate the consumption of data associated with all of the partitions in the consumer group. When a request to read data is received, the partition manager 8070 may determine whether the computing device on which it is executing is responsible for coordinating the read request. If so, control is passed to the coordination mapper 8080 to process the read request. Otherwise, a response is returned indicating which computing device has control over such read requests. In this way, the partition manager 8070 may operate to load balance read requests across the computing devices of the queueing system.

The coordination mapper 8080 controls the reading of data and transmission of data to clients by retrieving data from the partitions that make up the consumer group to which a read request is associated and transmitting the retrieved data to the client to which the read request originates.

The storage 7060 may include a data access 8100, a segment index 8110, local storage 8120, a cold storage loader 8130, an eviction handler 8140, and an eviction policy 8140 components in implementations of a tiered queuing system. Implementations of this disclosure may include additional or fewer components and may further combine or separate components.

The data access 8100 operates to receive requests to store and to access data that is stored in one or more segments (e.g., a file that stores data in a log of key/value pairs). The segment index 8110 indicates where particular segments are stored. For example, a segment may have a unique identifier, the segment index 8110 may have an entry for that unique identifier, and that entry may indicate whether the segment is stored in local storage 8120 or cold storage 8200. The segment index 8110 may be stored local to the computing device (and e.g., may be replicated among computing devices in the region or throughout the queuing system) or remote from the computing device. The segment index 8110 or portions thereof may be synchronized between computing devices and cores of the queuing system. For example, portions of the segment index 8110 may be synchronized from a raft leader to its raft followers. For example, the segment index 8110 may be associated with a management raft group and may be synchronized in whole or part to all computing devices and cores in the queuing system or those computing devices and/or cores within a particular region of the queuing system.

Local storage 8120 operates to store segments. Local storage 8120 may be accessed, for example, if the segment index 8110 indicates that a particular segment needed for read or write operations is located in local storage 8110. Local storage 8120 may be implemented using relatively fast storage, such as using solid-state storage media, such as using NVMe. Local storage 8120 may include storage which may be physically a part of the computing device or may be separate from the computing device, e.g., provided by a cloud service provider.

The cold storage loader 8130 is configured to transfer segments between local storage 8120 and cold storage 8200. Cold storage 8200 may be implemented using slower and less expensive storage that local storage 8120 and may take the form of storage provided by a cloud services provider. For example, cold storage 8200 may take the form of single region storage with higher latency access specifications. For example, cold storage 8200 may be implemented using Amazon Simple Storage Service or a similar service provided by another cloud service provider. The cold storage loader 8130 may cause the transfer of segments from local storage 8120 to cold storage 8200 responsive to an eviction policy indicating that a segment is to be evicted from local storage 8120, such as described with respect to FIG. 9. The cold storage loader 8130 may cause the transfer of segments from cold storage 8200 to local storage 8120 responsive to a read request, such as described with respect to FIG. 10. The cold storage loader 8130 may also cause the copying of segments using a cloud-native copy operation from one region to another, such as described with respect to FIG. 6 and FIG. 10. The cold storage loader 8130 may include scripting capability to enable transformations of segments when they are moved to cold storage from local storage. For example, such functionality may permit the conversion of segments into a column-oriented data storage format that interleaves multiple segments into a single file or set of files on a column-oriented basis.

The eviction handler 8140 is configured to interpret and effectuate the eviction policy 8150. For example, the eviction policy 8150 may indicate that a segment stored in local storage 8120 should be moved to cold storage 8200 based on one or more criteria, such as time (e.g., time elapsed since the segment was created or modified), space (e.g., available or used space in local storage), or retention (e.g., number of records required to be retained in local storage). The eviction policy 8150 may vary for different topics, partitions, or the like or there may be multiple eviction policies implemented depending on factors such as topic or partition. The eviction handler 8150 may operate, e.g., on a polling basis, for example, it may execute according to a timer or time interval. Alternatively, the eviction handler 8150 may operate on an event driven basis.

The eviction handler 8150 may operate differently for a given topic and partition based on whether the computing device and core on which the eviction handler 8150 executes is the raft leader for that given topic and partition. For example, if the core is the raft leader, the eviction handler 8150 may cause the deletion of a segment from local storage, copy the segment to cold storage, and update a segment index, such as described later with respect to FIG. 9. For example, if the core is the raft follower, the eviction handler 8150 may operate to delete segments from local storage without copying segments to cold storage or updating the segment index. For example, the eviction handler 8150 of a raft follower may initiate the deletion of a segment by following the eviction policy in a similar manner to the raft leader. Alternatively, the eviction handler 8150 of a raft follower may initiate the deletion of a segment responsive to receiving instructions from the raft leader to do so.

Figure 9:
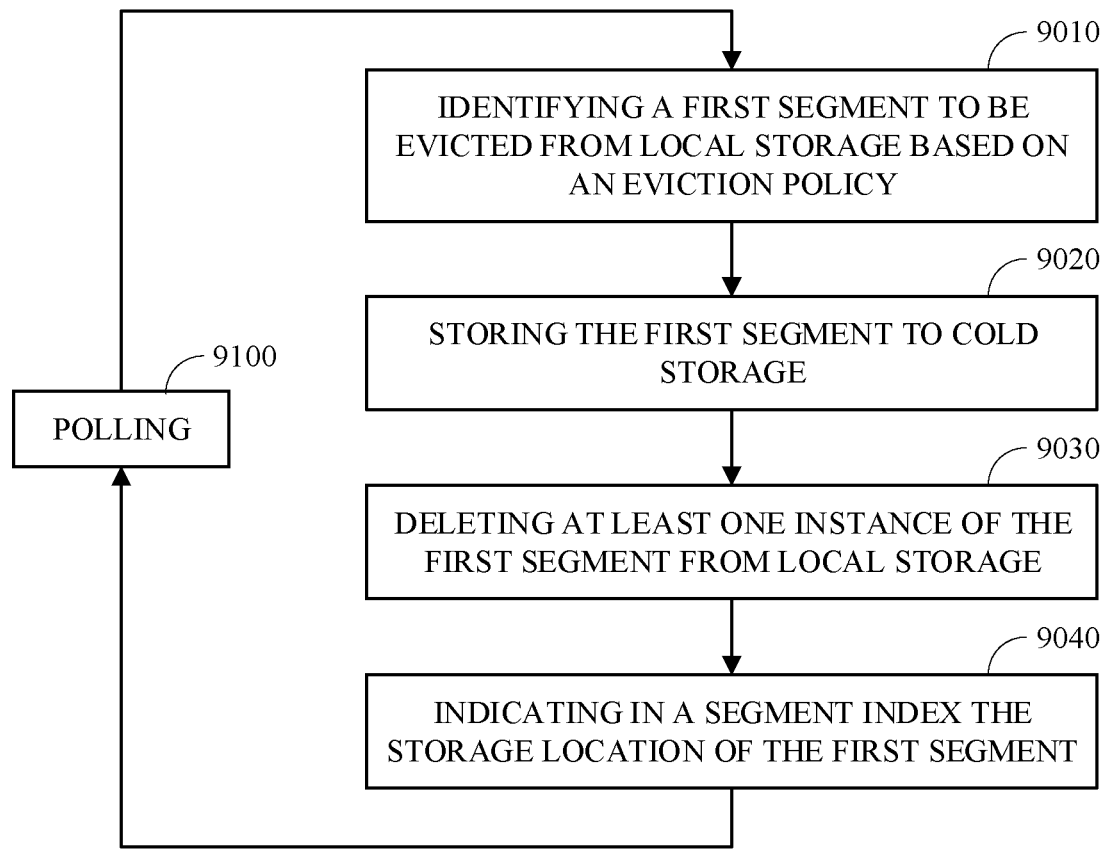
FIG. 9 is a diagram of an example of operations associated with applying an eviction policy in a tiered queuing system.

FIG. 9 is a diagram of an example of operations associated with applying an eviction policy in a tiered queuing system. For example, the steps of FIG. 9 may be performed by a computing device in a queuing system (see, e.g., 1000 of FIG. 1, 3100-3500 of FIG. 3, 7000 of FIG. 7, FIG. 8). For example, steps to be performed by a computing device may be performed by a processing thread associated with (e.g., pinned to) a core, and the processing thread may execute instructions stored in memory that are designed to effectuate the steps described herein. The steps of FIG. 9 may be performed by a raft leader for topics and segments assigned to that raft leader. Different steps may be performed by a raft follower, as further described herein.

At step 9010, a first segment is identified that is to be evicted from local storage based on an eviction policy. In this step, an eviction policy (e.g., the eviction policy 8150), which indicates one or more criterion for moving a segment from local storage to cold storage, is evaluated (e.g., by the eviction handler 8140) against segments stored in local storage (e.g., local storage 8120) to identify one or more segments (e.g., including a first segment) to be evicted.

At step 9020, the identified first segment is stored in cold storage. For example, the first segment may be copied to cold storage (e.g., cold storage 8200), using, e.g., cold storage loader 8130.

At step 9030, at least one instance of the first segment is deleted from local storage. For example, the first segment may include key/value pairs associated with a given topic and partition. The topic and partition may be associated with a raft group which provides fault tolerance by adding data using a raft leader and distributing the data associated with the topic and partition to raft followers of the raft group. For example, a raft leader may cause a segment to be copied to its raft followers once the segment is completed (e.g., filled with data, up to a size limit for segments, such as 500 MB or 1 GB). Accordingly, local storage (which may include various storage devices associated with various computing devices in a particular region as described with respect to FIG. 6) may include multiple copies of a given segment.

Step 9030 may operate to delete an instance of the first segment from local storage, e.g., that is associated with the raft leader performing the steps of the process described in this FIG. 9. In some implementations, as a part of step 9030, the raft leader may transmit instructions to its respective raft followers for the topic and partition to which the first segment pertains to also delete their copies of the first segment. In such an implementation, once the raft followers execute such instructions, the first segment should be fully removed from local storage. Such implementations have the advantage of deterministically causing the deletion of all instances of a segment from local storage at the expense of greater complexity.

In other implementations, raft followers may independently identify segments to delete according to an eviction policy. For example, for segments for which a computing device core is a raft follower, a modified version of the steps of this FIG. 9 may be followed such that steps 9020 and 9040 are omitted (e.g., the segment is deleted from local storage, but no action is taken to move the segment to cold storage or to update the segment index, because the raft leader is responsible for those steps). Such implementations have the advantage of lower complexity at the cost of less durability in the event of a system failure (e.g., which may result in certain segments being lost if a raft leader fails to upload a segment to cold storage).

At step 9040, a segment index is updated to indicate that the first segment is stored in cold storage. For example, a segment may be identified by a unique identifier and a Boolean or other value may be entered into the segment index associated with such a unique identifier indicating that the segment is stored in cold storage. In some implementations, the segment index may include additional information regarding the storage location or manner of a segment.

At step 9100, the process of FIG. 9 is paused or stopped, e.g., for a certain number of seconds or minutes before being executed again. For example, a timer may be used to determine when the steps of FIG. 9 should be executed again. Step 9100 may be omitted, and other mechanisms may be utilized to cause the steps of FIG. 9 to be followed at appropriate times or time intervals. For example, an event driven process may be used to initiate execution of the steps of FIG. 9.

Figure 10:
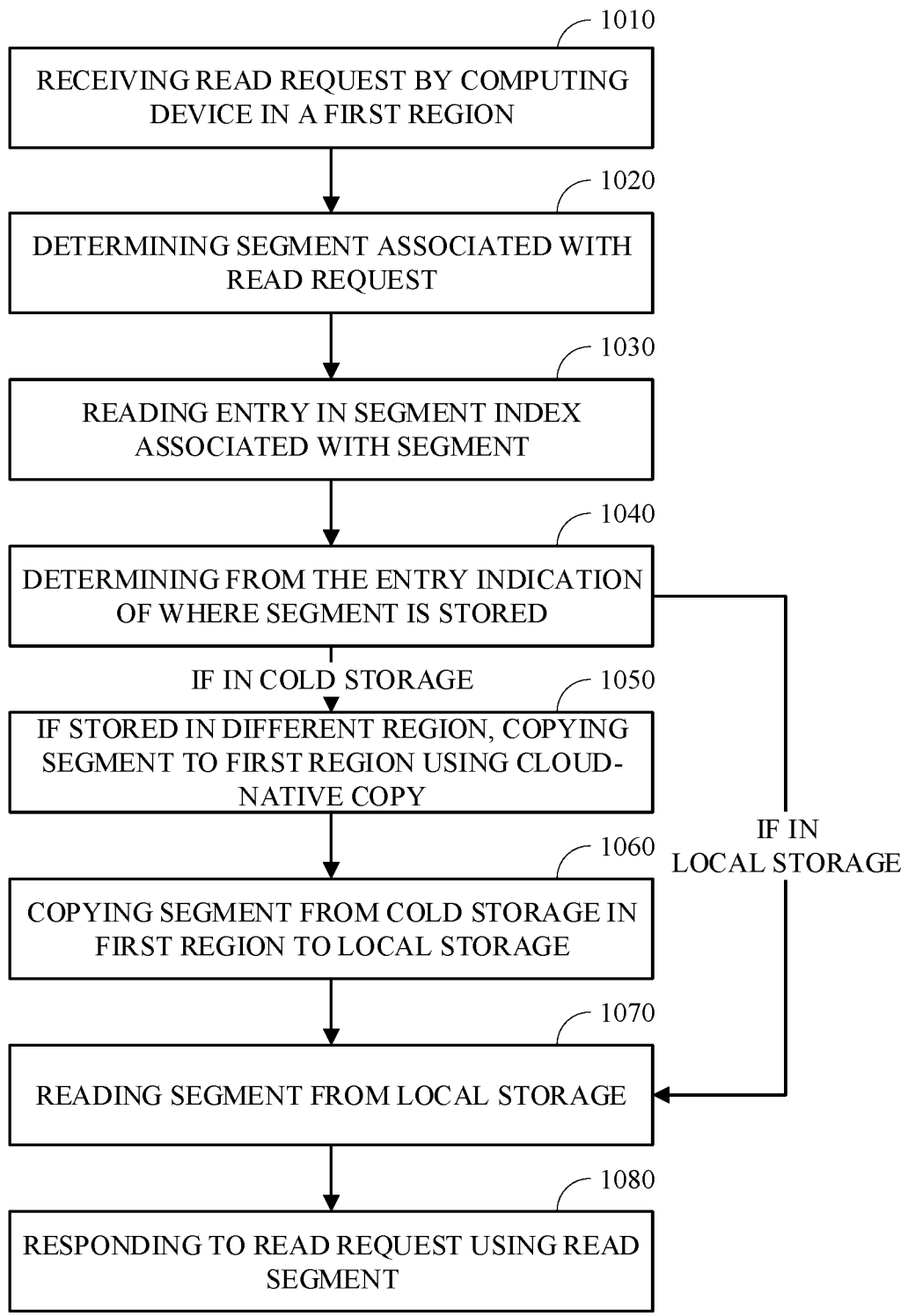
FIG. 10 is a diagram of an example of operations associated with responding to a read request in a tiered queuing system.

FIG. 10 is a diagram of an example of operations associated with responding to a read request in a tiered queuing system. For example, the steps of FIG. 10 may be performed by one or more computing device in a queuing system (see, e.g., 1000 of FIG. 1, 3100-3500 of FIG. 3, 7000 of FIG. 7). For example, steps to be performed by a computing device may be performed by a processing thread associated with (e.g., pinned to) a core, and the processing thread may execute instructions stored in memory that are designed to effectuate the steps described herein. The steps of FIG. 10 may, for example, be performed by a core of a computing device that receives or is assigned a read request from a client.

At step 1010, a read request is received by a computing device in a first region. The read request may be sent by a client and may include instructions to provide data associated with, for example, one or more topics and/or partitions, at least some of which may be associated with regions other than the first region.

At step 1020, the computing device determines one or more segments associated with the read request. For example, the read request may include a logical offset field that describes the position in the queue from which data is requested. The logical offset, for example, may permit the computing device to determine which segment(s) the requested data is located in (e.g., based on the size of individual queue items and the sizes of the segments; based on metadata associated with segments indicating the logical offset ranges stored within the various segments, other mechanisms, or combinations thereof).

At step 1030, an entry in the segment index (e.g., segment index 8110) that is associated with the segment is read. The entry indicates whether the segment is stored in local or cold storage, and this is determined by the computing device in step 1040.

If the segment is stored in cold storage, processing continues at step 1050. If the segment is stored in local storage, processing continues at step 1070. At step 1050, if the segment is stored in a different region from the computing device executing the steps of FIG. 10 (as shown, e.g., in FIG. 6), the segment is copied to cold storage in the first region from the different region using a cloud-native function (e.g., copy API). For example, the computing device may determine whether the segment is stored in the first region and if it is not, it may search for the segment in other regions and cause the segment to be copied from another region in which it is found. For example, the originating region for a segment may be determinable based on a topic name if topic names are assigned using a taxonomy that includes a region name (e.g., prefix of "us-east-1" or the like).

At step 1060, the segment is copied from cold storage in the first region to local storage in the first region. This step may also be preformed using a cloud-native copy operation if both cold storage and local storage are implemented using the same cloud services provider.

At step 1070, the segment is read from local storage, and the read segment is used in step 1080 to respond to the read request with the requested data.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The arrangements shown in the figures should not be viewed as limiting. Other embodiments can include more or less of each element shown in a given figure. Further, some of the illustrated elements can be combined or omitted. Yet further, an example embodiment can include elements that are not illustrated in the figures.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for operating a tiered queuing system, the method comprising:
    identifying, by a computing device in a first region, a first segment to be evicted from a local storage in the first region based on an eviction policy;
    storing the first segment in a cold storage in the first region provided by a cloud service provider;
    deleting at least one instance of the first segment from the local storage in the first region;
    indicating in a segment index that the first segment is stored in at least one cold storage;
    responsive to receipt of a read request, reading an entry in the segment index for a second segment; and
    responsive to an indication that the second segment is stored by the cloud service provider, copying the second segment to the local storage and responding to the read request using the second segment stored in the local storage; and
    wherein copying the second segment to the local storage comprises:
    determining whether the second segment is stored in the cold storage in the first region; and
    responsive to a determination that the second segment is not stored in the first region, invoking a cloud-native copy operation to copy the second segment from a second region to the first region.

2. The method of claim 1, wherein invoking a cloud-native copy operation to copy the second segment from a second region to the first region comprises copying the second segment from the cold storage in the second region to the cold storage in the first region, and
    wherein copying the second segment to the local storage further comprises copying the second segment from cold storage in the first region to local storage in the first region.

3. The method of claim 2, wherein the cold storages are implemented using spinning disks and local storage is implemented using solid-state storage.

4. The method of claim 2, wherein each of the cold storages provided by the cloud service provider are configured to store segments in a single region; and
    wherein the local storage is provided by the cloud service provider and copying between the local storage and the cold storage is performed using a cloud-native function.

5. The method of claim 1, wherein the cloud-native copy operation is configured to use a cloud-native transport to copy the second segment from the second region to the first region.

6. The method of claim 1, wherein the first segment stores data associated with a first topic, the second segment stores data associated with a second topic, and the first segment and the second segment are stored in the cold storage in an interleaved fashion using a column-oriented data storage format.

7. The method of claim 1, wherein deleting the at least one instance of the first segment from the local storage in the first region includes deleting the first segment from storage associated with a raft leader of a raft group for a partition associated with the first segment.

8. The method of claim 7, wherein a raft follower of the raft group for the partition associated with the first segment deletes the segment according to a time interval associated with the eviction policy.

9. The method of claim 7, wherein a raft follower of the raft group for the partition associated with the first segment deletes the segment responsive to instructions received from the raft leader of the raft group.

10. The method of claim 1, wherein the first segment is copied to a second region using a cloud-native copy operation.

11. An apparatus comprising:
    a memory; and
    a processor configured to execute instructions stored in the memory to:
    identify a first segment to be evicted from a local storage in a first region based on an eviction policy;
    store the first segment in a cold storage in the first region provided by a cloud service provider;
    delete at least one instance of the first segment from the local storage in the first region;
    indicate in a segment index that the first segment is stored in the cold storage;
    responsive to receipt of a read request, read an entry in the segment index for a second segment; and
    responsive to an indication that the second segment is stored by the cloud service provider, copy the second segment to the local storage from the cloud service provider and respond to the read request by reading from the second segment stored in the local storage; and
    wherein the instructions to copy the second segment to the local storage comprises instructions to:
    determine whether the second segment is stored in the cold storage in the first region; and
    responsive to a determination that the second segment is not stored in the first region, invoke a cloud-native copy operation to copy the second segment from a second region to the first region.

12. The apparatus of claim 11, wherein the first segment stores data associated with a first topic and the second segment stores data associated with a second topic and the first segment and the second segment are stored in the cold storage in an interleaved fashion using a column-oriented data storage format.

13. The apparatus of claim 11, wherein the instructions to store the first segment in a cold storage in the first region includes instructions to execute a script configured to de-identify personal information present in the first segment.

14. A tiered queueing system comprising:
    a plurality of computing devices in a first region configured to receive queue requests and store data associated with the received queue requests in a plurality of segments in local storage in the first region, at least one of the computing devices further configured to:
    respond to a read request by:
    reading an entry in a segment index associated with a first segment;
    determining, based on the entry, that the first segment is stored in a cold storage;
    determining that the cold storage in which the first segment is stored is a cold storage in a second region and not a cold storage in a first region;
    copying the first segment from the cold storage in the second region to the cold storage in the first region using a cloud-native copy operation;

copying the first segment from the cold storage in the first region to the local storage in the first region; and determining a response to the read request by reading the first segment from the local storage in the first region.

15. The tiered queuing system of claim 14, wherein the at least one of the computing devices is further configured to:
apply an eviction policy by:
copying a second segment that meets a criterion of the eviction policy from the local storage in the first region to the cold storage in the first region;
deleting a first instance of the first segment from the local storage; and
indicating in the segment index that the at least one first segment is stored in at least one, cold storage.

16. The tiered queuing system of claim 15, wherein the first instance of the first segment is associated with a raft leader of a raft group for a partition associated with the first segment and the raft leader causes the deletion of the first instance of the first segment.

17. The tiered queueing system of claim 16, wherein a raft follower of the raft group for the partition associated with the first segment deletes a second instance of the first segment according to a time interval associated with the eviction policy.

18. The tiered queueing system of claim 16, wherein a raft follower of the raft group for the partition associated with the first segment deletes a second instance of the first segment responsive to an instruction received from the raft leader of the raft group.

* * * * *